(12) United States Patent
Sahin et al.

(10) Patent No.: US 12,521,413 B2
(45) Date of Patent: Jan. 13, 2026

(54) MOLECULAR BASIS OF FATTY LIVER INHIBITION BY SODIUM BORATES

(71) Applicant: YEDITEPE UNIVERSITESI, Istanbul (TR)

(72) Inventors: Fikrettin Sahin, Istanbul (TR); Emre Cebeci, Istanbul (TR); Huseyin Abdik, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 306 days.

(21) Appl. No.: 18/038,738

(22) PCT Filed: Nov. 25, 2020

(86) PCT No.: PCT/TR2020/050924
§ 371 (c)(1),
(2) Date: May 25, 2023

(87) PCT Pub. No.: WO2022/115049
PCT Pub. Date: Jun. 2, 2022

(65) Prior Publication Data
US 2024/0000831 A1    Jan. 4, 2024

(51) Int. Cl.
*A61K 33/22*    (2006.01)
*A61P 1/16*    (2006.01)

(52) U.S. Cl.
CPC ............... *A61K 33/22* (2013.01); *A61P 1/16* (2018.01)

(58) Field of Classification Search
CPC ............ A61K 31/69; A61K 33/22; A61P 1/16
See application file for complete search history.

(56) References Cited

U.S. PATENT DOCUMENTS

| | | | | |
|---|---|---|---|---|
| 5,587,221 A * | 12/1996 | McCamy | ............... | A01N 59/14 424/657 |
| 9,655,990 B2 * | 5/2017 | Sahin | ................... | A61L 26/0004 |
| 9,962,405 B2 * | 5/2018 | Sahin | ...................... | A61K 9/06 |
| 10,124,082 B2 * | 11/2018 | Santini | ..................... | A61L 9/127 |
| 11,123,432 B2 * | 9/2021 | Sahin | ..................... | A01N 59/00 |
| 2024/0050468 A1 * | 2/2024 | Sahin | ..................... | A61K 47/32 |

FOREIGN PATENT DOCUMENTS

| | | |
|---|---|---|
| EP | 2351748 A1 | 8/2011 |
| EP | 3134417 A1 | 3/2017 |
| WO | 2019126090 A1 | 6/2019 |
| WO | 2020006294 A1 | 1/2020 |

OTHER PUBLICATIONS

Woods; Environmental Health Perspectives; vol. 102, Issue: Suppl 7; pp. 5-11. Published Nov. 1, 1994.*
Ayala Wollman, et al., Sarcopoterium spinosum Inhibited the Development of Non-Alcoholic Steatosis and Steatohepatitis in Mice, Nutrients, 2019, pp. 1-18, vol. 11, 3044.
Monjur Ahmed, Non-alcoholic fatty liver disease in 2015, World Journal of Hepatology, 2015, pp. 1450-1459, vol. 7, Issue 11.
Brian J. Morris, Seven sirtuins for seven deadly diseases of aging, Free Radical Biology and Medicine, 2013, pp. 133-171, vol. 56.
Safety and Efficacy of Simtuzumab (SIM, GS-6624) in Adults With Advanced Liver Fibrosis But Not Cirrhosis Secondary to Non-Alcoholic Steatohepatitis (NASH), Clinical Trials Gov, 2012, pp. 1-8.
Manhal Olaywi, et al., Novel anti-diabetic agents in non-alcoholic fatty liver disease: a mini-review, Hepatobiliary Pancreat Dis Int, 2013, pp. 584-588, vol. 12, No. 6.
Aliye Sagkan Ozturk, Effects of Borax on the Pathogenic Mechanisms Leading to Fatty Liver, 2008, Doctorate Thesis Selcuk University, pp. 1-82.
Abdullah Basoglu, et al., Efficacy of Sodium Borate in the Prevention of Fatty Liver in Dairy Cows, J Vet Intern Med, 2002, pp. 732-735, vol. 16.
Ismail Kucukkurt, et al., The effects of dietary boron compounds in supplemented diet on hormonal activity and some biochemical parameters in rats, Toxicology and Industrial Health, 2015, pp. 255-260, vol. 31, No. 3.
Silvia Sookoian, et al., Repurposing drugs to target nonalcoholic steatohepatitis, World Journal of Gastroenterology, 2019, pp. 1783-1796, vol. 25, Issue 15.

* cited by examiner

*Primary Examiner* — Jeffrey T. Palenik
(74) *Attorney, Agent, or Firm* — Bayramoglu Law Offices LLC

(57) ABSTRACT

Sodium borates are provided as the sole active ingredient to prevent and/or treat fatty liver. In addition, the sodium borates reduce the expression levels of ADIPOR2, PRKAG2, IRS1, PIK3R1, NFKB1, MAP3K11, BID, CYCS, BAX, CASP3 and TGFB1 genes in the non-alcoholic fatty liver pathway and thereby to prevent and/or treat fatty liver by inhibiting the functioning of the non-alcoholic fatty liver pathway.

5 Claims, 3 Drawing Sheets

MOLECULAR BASIS OF FATTY LIVER INHIBITION BY SODIUM BORATES

FIELD OF THE INVENTION

The present invention relates to the use of sodium borates to prevent and/or treat fatty liver.

BACKGROUND OF THE INVENTION

The liver is an organ with numerous functions, including the production of enzymes necessary for protein synthesis and digestion in vertebrates. The liver plays an important role in metabolism and has many functions such as hormone production, red blood cell production, glycogen storage, plasma and protein synthesis. The liver also produces bile, which is an alkaline fluid that helps fat digestion, and transfers it to the duodenum and gall bladder. Absence or dysfunction of this vital organ, which is located in the abdomen in humans, may cause adverse effects on body functions and loss of life at a later stage.

Currently, there is no treatment directly related to fatty liver [1]. Generally, people are recommended to improve their living conditions, raise their living standards and change their dietary habits [2]. However, since this is not exactly therapeutic, it is necessary to develop new and effective agents. Accordingly, there are particular agents under investigation. Agents such as Sirtuin [3] and Simtuzumab [4] are examples of these agents. Besides these, some drugs used in the treatment of Type 2 Diabetes are used to take fatty liver under control. Examples include Sitagliptin, Liraglutide, Pioglitazone and Exenatide [5].

Some of the agents developed to control fatty liver have some side effects, while others are not yet suitable for market release. The side effects caused can be listed as follows: low blood sugar, nausea, vomiting, stomach disorders, loss of appetite, diarrhea, constipation, headache, dizziness, itching, transfer into breast milk, heart failure, hypersensitivity, fatigue and more importantly it has been shown that it may trigger some types of cancer.

Patent application document WO2019126090, one of the applications known in the art, relates to compositions that prevent fatty liver.

Patent application document WO2020006294, one of the applications known in the art, relates to the treatment of liver diseases with calpain inhibitors.

Patent application document EP3134417, one of the applications known in the art, discloses compounds and compositions used to relieve liver dysfunction.

Patent application document EP2351748, one of the applications known in the art, discloses isoquinoline derivatives for use in the treatment of various diseases.

SUMMARY OF THE INVENTION

The objective of the present invention is to use sodium borates to prevent and/or treat fatty liver.

DETAILED DESCRIPTION OF THE INVENTION

Figure 1A:
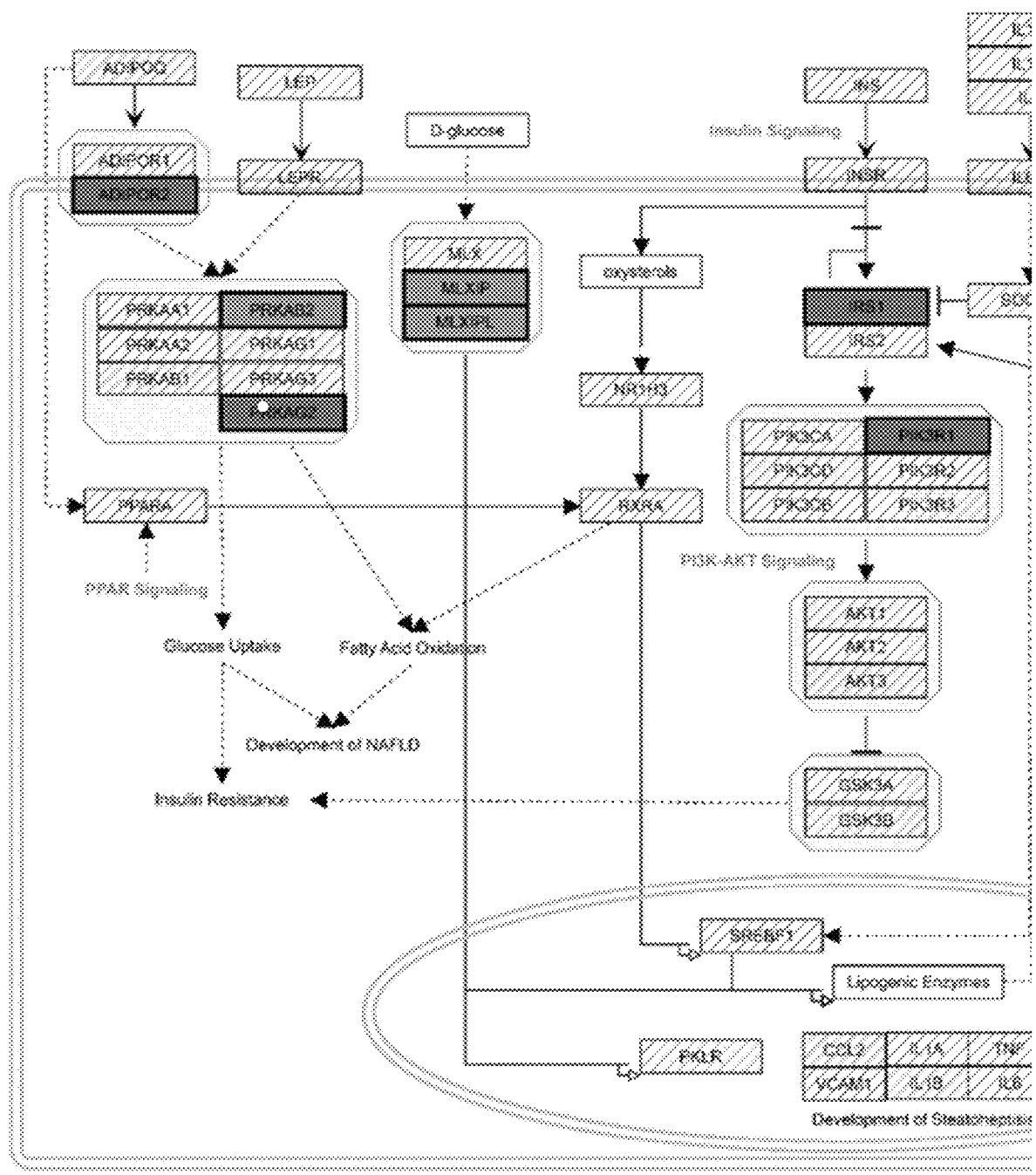
Figure 1B:
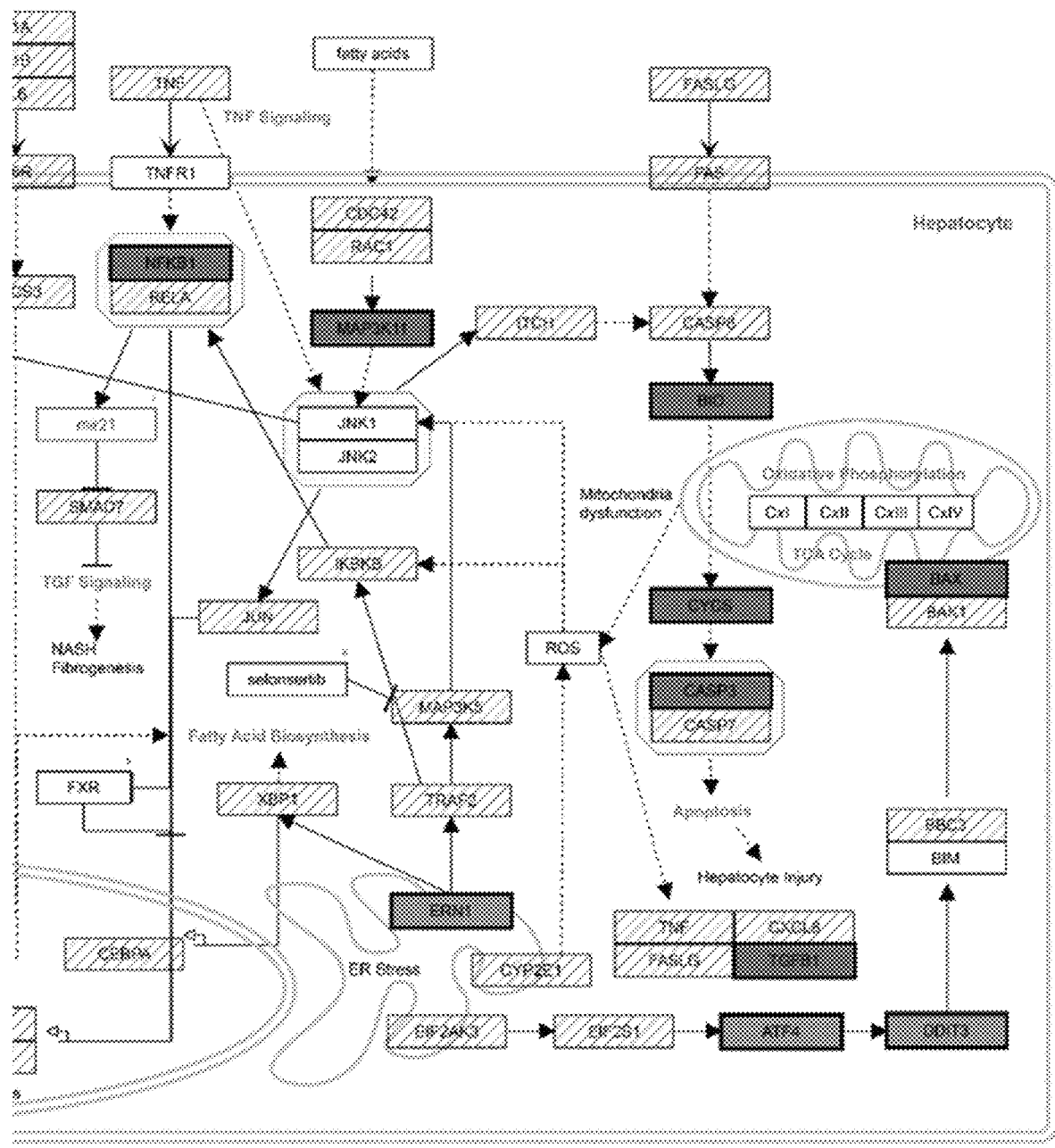

The "Molecular Basis of Fatty Liver Inhibition by Sodium Borates" developed to fulfill the objective of the present invention is illustrated in the accompanying figures, in which:

FIG. 1—shows the graphical representations of all changes in the level of gene expression associated with fatty liver after treatment with sodium borates.

FIG. 2—shows the representations of the experimental study results carried out during the development of the invention. ((A) shows the graphical representations of the liver weight averages at the end of 10 weeks of the Control group fed with a normal diet, the Group fed with only high-fat diet, and the mice treated with two different doses of Sodium borate in addition to the high fat diet, (B) shows the representations of the results of the hematoxylin-eosin staining technique of liver tissue under a light microscope.)

The parts in the figures are numbered and their equivalents are given below:

YYD. High-fat diet
SB. Sodium borate
VA. Body weight

The invention is the use of sodium borates to prevent and/or treat fatty liver. Within the scope of the invention, sodium borate is used by dissolving in PBS or water. Within the scope of the invention, at least one sodium borate selected from the group consisting of sodium pentaborate, disodium tetraborate, sodium octaborate, sodium borate, sodium ortaborate, sodium phenylborate, sodium tetrafloraborate and combinations thereof is used.

Within the scope of the invention, during the treatment process, the amount of sodium borate used is 0.5 mg/g as the low dose and 1.5 mg/g as the high dose. The calculation to be made is as follows:

adapting 0.5 mg/g dose administered to mice to an 80 kg human;
80 kg=80000 g
0.5*80000=40000 mg
When adapting from mice to humans, this value should be divided by 60.
40000/60=666.66 mg=0.66 g adapting 1.5 mg/g dose administered to mice to an 80 kg human;
80 kg=80000 g
1.5*80000=120000 mg
When adapting from mice to humans, this value should be divided by 60.
120000/60=2000 mg=2 g In summary, when adapting animal experiments to humans, the adjustments are made such that 1 kg of mouse weight=60 kg of human weight. This corresponds to the range of 0.66 g-2 g for an 80 kg human.

Within the scope of the invention, sodium borates have been proven to have direct therapeutic properties (FIG. 2), and secondly, unlike the practices in the state of the art, treatment is performed through "non-alcoholic fatty liver disease pathway". The important point for the course of the disease is the effect of the active ingredient used on the relevant pathway. The said pathway is a pathway whose all relevant genes and functions are already determined. The active ingredients we use stop the formation and progression of the disease by inhibiting the functioning of this pathway. In the technical part, FIG. 1 illustrates the genes on which they act in the pathway to stop the pathway.

Today, there is no specific drug for direct treatment of fatty liver. In this study, it has been proved by both molecular mechanisms and animal experiments that the direct use of sodium borates has the purpose of treatment and prophylaxis. In the experimental studies carried out within the scope of the invention, it is observed that sodium borates directly inhibit fatty liver. In addition to knowing that borates do not have any side effects, the fact that it is very easy to access and use boron minerals since 74% of the world's boron reserves are within the borders of our country supports the importance of the subject of invention. Sodium borate, which is a borate, does not have any adverse effects on the body, and it is known that taking up to 18 mg of boron daily in adults does not cause any side effects. When we adapted the toxicology studies we carried out in rats to humans, it was seen that a daily dose of 500 mg had no side effects. It is known that boron homeostasis taken into mammalian systems is excreted via urine within 72 hours. Boron also regulates calcium, potassium and magnesium metabolisms in the body. A decrease was observed in the amount of minerals excreted via urine of the subjects who received optimal amount of boron daily. Sodium borate is a substance that costs 2,000 TL per ton, indicating that a possible drug to be produced will be inexpensive.

As seen in FIG. 1, sodium borates decreased expression levels of ADIPOR2, PRKAG2, IRS1, PIK3R1, NFKB1, MAP3K11, BID, CYCS, BAX, CASP3 and TGFB1 genes in the non-alcoholic fatty liver pathway by 2 times or more. The decrease in the expression levels of these genes substantially prevents or completely stops the functioning of this pathway, which is the molecular basis of the disease. Thus, fatty liver can be prevented. Also, within the scope of the invention, sodium borates are used to prevent and/or treat fatty liver by inhibiting the functioning of the non-alcoholic fatty liver pathway.

The decrease in the expression levels of the genes means a decrease in the functioning and product synthesis of the genes. The selected genes are not specifically selected. The selected genes are those whose expression is reduced after sodium borate administration. In order to slow down or stop the pathway, the expression levels of some of the genes in the pathway must decrease. Technically, it is not important which gene expression levels are reduced. The pathway could also slow down as a result of the decrease in the expression levels of genes other than these. However, in our study, sodium borates directly affected these genes.

Experimental Studies

Microarray Experiment

All changes in the level of gene expression related to fatty liver in healthy human cells were determined by this method upon being treated with sodium borates for 3 days. It was determined how these genes affect the pathway related to fatty liver. As a result of the microarray experiment, it is understood that the expression level of many genes in the non-alcoholic fatty liver pathway decreased by 2 times and more, and fatty liver was prevented as the pathway lost its function substantially. Genes, whose expression was reduced, were ADIPOR2, PRKAG2, IRS1, PIK3R1, NFKB1, MAP3K11, BID, CYCS, BAX, CASP3 and TGFB1 (FIG. 1). In our in vivo study, it has been proven on animals that fatty liver was inhibited as a result of the failure of this pathway.

Figure 2A:
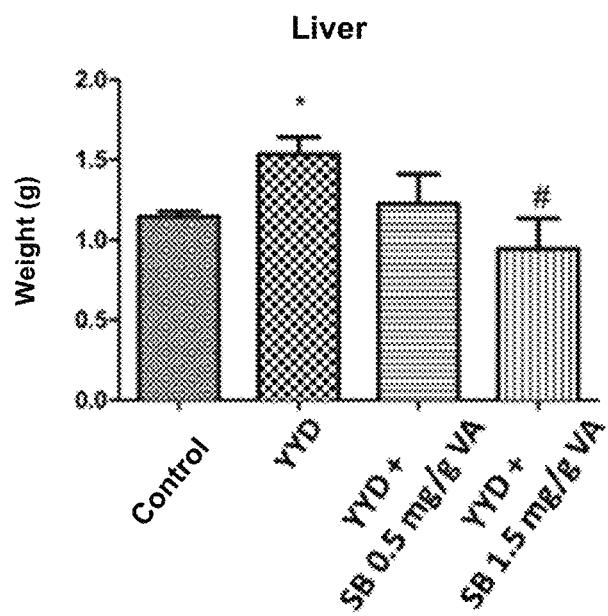

In Vivo Experiment 8-weeks-old female 24 balb/c mice were used for the in vivo experiment. The adaptation process was completed in cages in a temperature-controlled room with a 12-hour light/dark cycle. Then, the mice were divided into four different dietary groups (n=6 for each group): normal diet (2.70 kcal/g), high-fat diet (YYD) (4.00 kcal/g), YYD supplemented with 0.5 mg/g SB, and YYD supplemented with 1.5 mg/g SB. At the end of 10 weeks, mice were sacrificed and weights of their livers were measured. At the end of 10 weeks, the livers of the mice were removed and weighed, and it was observed that fatty liver caused by high-fat diet was inhibited by the use of 1.5 mg/g SB as a supplement (FIG. 2A).

Histological Evaluation

Figure 2B:
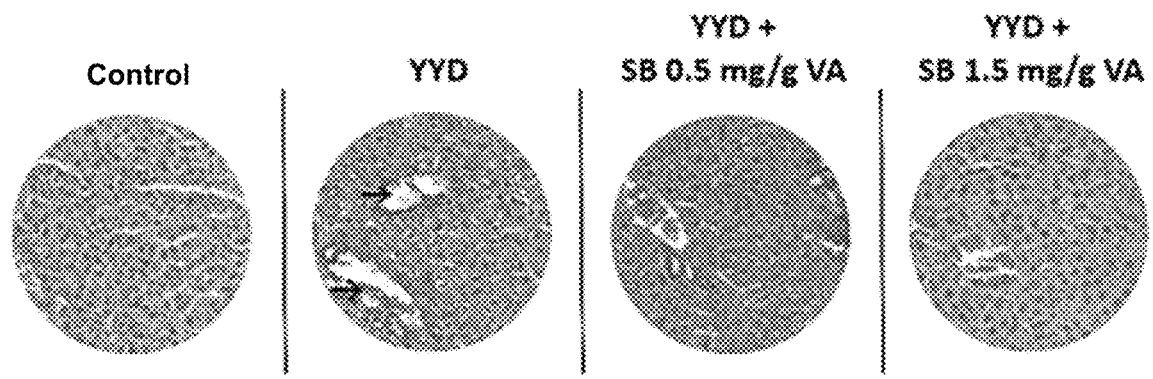

Liver tissues of mice were prepared for histological evaluation. These tissue samples were immersed in 10% neutral formaldehyde prepared with 0.1 M phosphate buffer (pH 7.4) for fixation at 4° C. Subsequently, the samples were rinsed in tap water for 12 hours, then dehydrated in an alcohol batch and embedded in paraffin. From samples embedded in paraffin, 5 micron thick samples were obtained using a rotary microtome (Leica RM 2245 model; Leica Instruments, Germany). All tissue sections were taken onto poly-L-lysine coated slides. All these samples were stained with hematoxylin eosin staining technique and imaged under a light microscope (Leica DM6000B). According to histological evaluations, it was determined that the use of both doses of sodium borate decreased the pathological disorders caused by high-fat diet (FIG. 2B). Scoring results of the histological evaluation are also given in Table 1. This method has been used to evaluate the situation of pathological deteriorations caused by high fat diet when different sodium boron administrations are applied and when not applied.

TABLE 1

Representation of hematoxylin-eosin staining technique scores.

| Group Name | (Mean ± Standard Deviation (SD)) n = 6 | P value |
|---|---|---|
| Control &. YYD | 1.60 ± 1.14 & 12.6 ± 1.54 | 0.001*** |
| Control &. YYD + 0.5 mg SB/g VA | 1.60 ± 1.14 & 8.6 ± 1.14 | 0.01** |
| Control &. YYD + 1.5 mg SB/g VA | 1.60 ± 1.14 & 3.6 ± 0.89 | 0.075* |
| YYD &. YYD + 0.5 mg SB/g VA | 12.6 ± 1.54 & 8.6 ± 1.14 | 0.001*** |
| YYD &. YYD + 1.5 mg SB/g VA | 12.6 ± 1.54 & 3.6 ± 0.89 | 0.001*** |
| YYD + 0.5 mg SB/g VA &. YYD + 1.5 mg SB/g VA | 8.6 ± 1.14 & 3.6 ± 0.89 | 0.01** |

Abbreviations YYD: High-Fat Diet, SB: Sodium Borate, n: Number of animals in each group ($*p < 0.05$, $p < 0.01$ and $*P < 0.001$)
&: indicates that a comparison is made between two different administration groups.
+: describes that two different administrations are carried out together.
P value is the value indicating whether there is a statistically significant difference.
the higher the * number, the greater the significant difference.

As indicated in the table, it was observed that, by means of administration of 0.5 mg SB/g VA and 1.5 mg SB/g VA sodium borate, the pathological disorder (12.6±1.54) in the liver caused by high-fat diet decreased, in a statistically significant manner, up to the values of 8.6±1.14 and 3.6±0.89, respectively.

REFERENCES

[1]. Wollman, Ayala, Tehila Daniel, and Tovit Rosenzweig. "*Sarcopoterium spinosum* Inhibited the Development of Non-Alcoholic Steatosis and Steatohepatitis in Mice." Nutrients 11.12 (2019): 3044.

[2]. Ahmed, Monjur. "Non-alcoholic fatty liver disease in 2015." *World journal of hepatology* 7.11 (2015): 1450.

[3]. Morris, Brian J. "Seven sirtuins for seven deadly diseases of aging." Free Radical Biology and Medicine 56 (2013): 133-171.

[4]. Gilead Sciences. Safety and Efficacy of Simtuzumab (GS-6624) in Adults With Advanced Liver Fibrosis But Not Cirrhosis Secondary to Non-Alcoholic Steatohepatitis (NASH). In: ClinicalTrials.gov [Internet]. Bethesda (MD): National Library of Medicine (US) Available from: http://www.clinicaltrials.gov/show/NCT01672866 NLM Identifier: NCT01672866.

[5]. Olaywi, Manhal, et al. "Novel anti-diabetic agents in non-alcoholic fatty liver disease: a mini-review." Hepatobiliary Pancreat Dis Int 12.6 (2013): 584-588.

What is claimed is:

1. A composition formulated for oral administration for use to treat and/or prevent non-alcoholic fatty liver disease (NAFLD) by downregulating disease-associated gene expression, consisting of phosphate-buffered saline (PBS) and at least one sodium borate selected from the group consisting of sodium tetraborate, sodium pentaborate, and sodium octaborate.

2. The composition according to claim 1, wherein the daily dose of the at least one sodium borate for an 80 kg human subject is from 0.66 g to 2 g, based on allometric scaling from efficacious doses demonstrated in murine in vivo models.

3. The composition according to claim 1, consisting of PBS and sodium tetraborate.

4. The composition according to claim 1, consisting of PBS and sodium pentaborate.

5. The composition according to claim 1, consisting of PBS and sodium octaborate.

* * * * *